(12) United States Patent
Civiero

(10) Patent No.: US 11,052,969 B2
(45) Date of Patent: Jul. 6, 2021

(54) CASSETTE AND BODY FOR MOUNTING A CASSETTE ON A BICYCLE REAR WHEEL HUB

(71) Applicant: CAMPAGNOLO S.r.l., Vicenza (IT)

(72) Inventor: Mirco Civiero, Montecchia di Crosara (IT)

(73) Assignee: Campagnolo S.r.l., Vicenza (IT)

( * ) Notice: Subject to any disclaimer, the term of this patent is extended or adjusted under 35 U.S.C. 154(b) by 293 days.

(21) Appl. No.: 16/159,850

(22) Filed: Oct. 15, 2018

(65) Prior Publication Data

US 2019/0112004 A1   Apr. 18, 2019

(30) Foreign Application Priority Data

Oct. 13, 2017   (IT) .................. 102017000115407

(51) Int. Cl.
  *B62M 9/10*     (2006.01)
  *B62M 9/04*     (2006.01)
  *F16H 55/30*    (2006.01)

(52) U.S. Cl.
  CPC .............. *B62M 9/10* (2013.01); *B62M 9/04* (2013.01); *B62M 9/105* (2013.01); *F16H 55/30* (2013.01)

(58) Field of Classification Search
  CPC .... B65H 9/04; B65H 9/10; B65H 9/12; F16H 55/30; B65M 9/04; B65M 9/10; B65M 9/12
  USPC ......................................................... 474/160
  See application file for complete search history.

(56) References Cited

U.S. PATENT DOCUMENTS

| 4,380,445 A | * | 4/1983 | Shimano | ................ B62M 9/105 474/144 |
| 4,642,075 A | * | 2/1987 | Nagashima | ............. F16H 55/30 474/158 |
| 4,741,724 A | * | 5/1988 | Wang | ..................... B62M 9/105 474/160 |
| 5,194,051 A | * | 3/1993 | Nagano | .................... B62M 9/10 474/160 |
| 6,024,662 A |   | 2/2000 | Fujimoto | |

(Continued)

FOREIGN PATENT DOCUMENTS

| CN | 202703831 U | 1/2013 |
| CN | 205769959 U | 12/2016 |

(Continued)

OTHER PUBLICATIONS

CN202703831U Translation; Rear Chain Wheel Component of Bicycle; Liu, C; Published: Jan. 30, 2013; Espacenet (Year: 2013).*

(Continued)

*Primary Examiner* — Michael R Mansen
*Assistant Examiner* — Raveen J Dias
(74) *Attorney, Agent, or Firm* — Volpe Koenig

(57) ABSTRACT

A cassette adapted for mounting on a bicycle rear wheel hub and a by a mounting body for positioning the assembly on a bicycle rear wheel hub. The cassette has a plurality of adjacent sprockets fixedly connected to one another along an axis of the cassette. The cassette has an axial centering opening for centering on the mounting body without transmission of torque, and a plurality of attachment areas positioned a greater radial distance from the axis of the cassette than the radius of the centering opening for attachment to the mounting body.

12 Claims, 7 Drawing Sheets

(56) References Cited

U.S. PATENT DOCUMENTS

| | | |
|---|---|---|
| 8,057,338 B2 | 11/2011 | Kamada |
| 8,100,795 B2 | 1/2012 | Reiter |
| 8,905,878 B2 | 12/2014 | Loy et al. |
| 9,550,547 B2* | 1/2017 | Valle ........................ B62M 9/12 |
| 2004/0121867 A1 | 6/2004 | Reiter |
| 2005/0272546 A1* | 12/2005 | Reiter ...................... B62M 9/10 |
| | | 474/152 |
| 2008/0188336 A1* | 8/2008 | Tokuyama ............... B62M 9/10 |
| | | 474/160 |
| 2009/0042681 A1 | 2/2009 | Dal Pra' et al. |
| 2009/0042682 A1 | 2/2009 | Dal Pra' et al. |
| 2009/0098966 A1* | 4/2009 | Kamada ................... B62M 9/10 |
| | | 474/160 |
| 2009/0191996 A1* | 7/2009 | D'Aluisio ................ B62M 9/12 |
| | | 474/152 |
| 2010/0009794 A1 | 1/2010 | Chiang |
| 2010/0099530 A1 | 4/2010 | Chiang et al. |
| 2011/0130233 A1 | 6/2011 | Tokuyama et al. |
| 2012/0208662 A1 | 8/2012 | Braedt |
| 2012/0220402 A1 | 8/2012 | D'Aluisio |
| 2012/0244976 A1* | 9/2012 | Lin .......................... B62M 9/10 |
| | | 474/160 |
| 2012/0244978 A1 | 9/2012 | Liao et al. |
| 2012/0302384 A1* | 11/2012 | Braedt ..................... B62M 9/10 |
| | | 474/160 |
| 2013/0017914 A1 | 1/2013 | Braedt |
| 2013/0035183 A1 | 2/2013 | Tokuyama et al. |
| 2015/0024884 A1* | 1/2015 | Braedt ...................... F16H 9/24 |
| | | 474/78 |
| 2015/0210353 A1* | 7/2015 | Tokuyama ............... B62M 9/12 |
| | | 474/160 |
| 2015/0285358 A1 | 10/2015 | Numata et al. |
| 2016/0114859 A1 | 4/2016 | Tsai et al. |
| 2016/0121965 A1* | 5/2016 | Tsai ........................ B29C 39/12 |
| | | 264/263 |
| 2016/0347410 A1* | 12/2016 | Watarai ................... B62M 9/10 |
| 2017/0043840 A1* | 2/2017 | Reinbold ................ F16H 55/30 |
| 2017/0057598 A1 | 3/2017 | Thrash et al. |
| 2017/0341707 A1* | 11/2017 | Braedt .................... F16D 1/108 |
| 2018/0022415 A1* | 1/2018 | Oishi ....................... F16D 1/10 |
| | | 474/160 |
| 2018/0022416 A1* | 1/2018 | Oishi ....................... B62M 9/10 |
| | | 474/160 |
| 2018/0105229 A1* | 4/2018 | Reinbold ................ B62M 9/122 |
| 2018/0215444 A1* | 8/2018 | Reinbold ............ B29C 65/1632 |
| 2018/0229801 A1* | 8/2018 | Nishimoto ............... B62M 9/10 |
| 2018/0281898 A1* | 10/2018 | Iwai ......................... B62M 9/12 |
| 2018/0297664 A1* | 10/2018 | Fukumori ............... B62M 9/10 |
| 2018/0346066 A1* | 12/2018 | Iwai ...................... B60B 27/023 |
| 2019/0054765 A1* | 2/2019 | Thrash .................... B62M 9/10 |
| 2019/0101204 A1* | 4/2019 | Fukunaga ............... B62M 9/00 |
| 2019/0112004 A1 | 4/2019 | Civiero |
| 2019/0113123 A1* | 4/2019 | Civiero ............... F16H 57/0025 |
| 2020/0070934 A1* | 3/2020 | Iwai ........................ B62M 9/10 |
| 2020/0122805 A1* | 4/2020 | Zubietaandueza ....... B62M 9/10 |
| 2021/0009233 A1* | 1/2021 | Xie ......................... B62M 9/12 |

FOREIGN PATENT DOCUMENTS

| | | |
|---|---|---|
| DE | 10342638 A1 | 4/2005 |
| DE | 102012006771 A1 | 10/2013 |
| GB | 2179570 A | 3/1987 |

OTHER PUBLICATIONS

Italian Search Report and Written Opinion in Italian Application No. 102017000115407, dated May 30, 2018, with English translation.

* cited by examiner

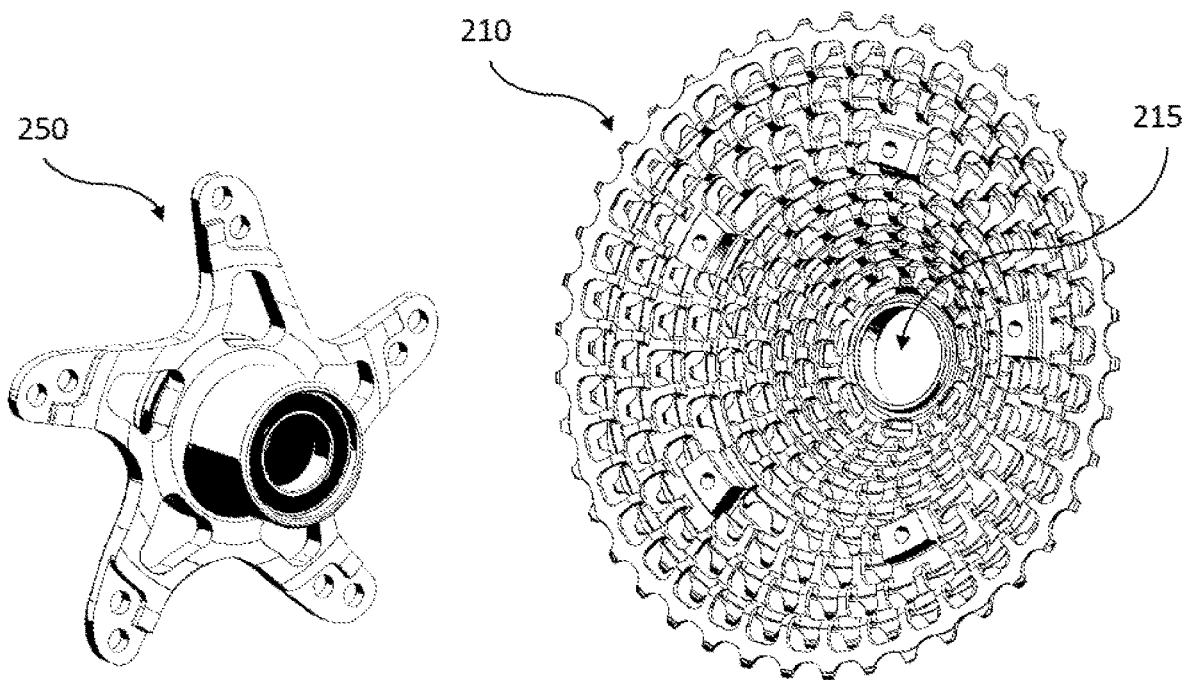
Fig. 13
Fig. 14
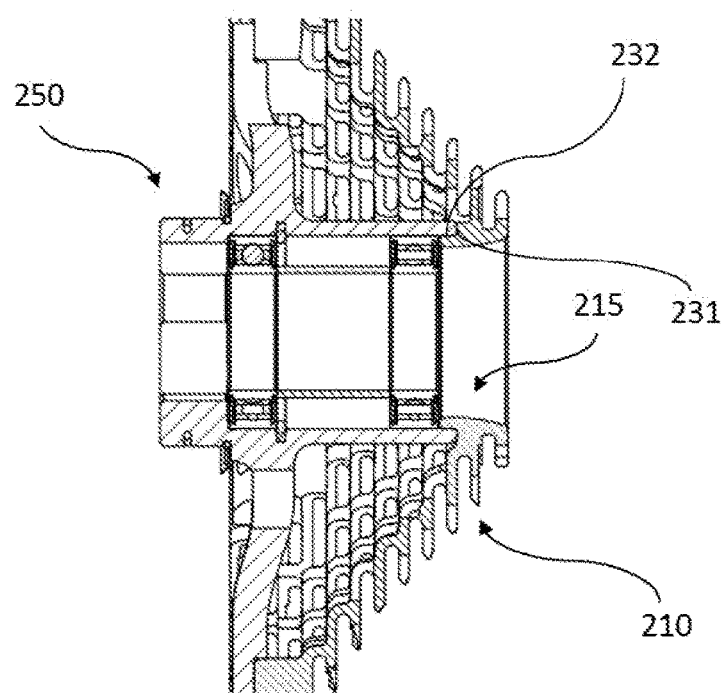
Fig. 15

CASSETTE AND BODY FOR MOUNTING A CASSETTE ON A BICYCLE REAR WHEEL HUB

CROSS REFERENCE TO RELATED APPLICATION(S)

This application claims the benefit of Italian Patent Application No. 102017000115407, filed on Oct. 13, 2017, which is incorporated herein by reference as if fully set forth.

FIELD OF INVENTION

The present invention refers to a cassette and to a body for mounting such a cassette on a bicycle rear wheel hub.

BACKGROUND

Bicycle transmission systems, historically, provided for a free wheel, namely a member that was screwed to a threading formed on the hub and comprised on the one hand the rear gears (sprockets) intended for engagement with the chain, on the other hand a mechanism (generally formed by ratchets) that allowed the transmission of the rotation to the hub only in one direction, to make it possible to stop pedaling without locking the driving wheel.

This solution has been technically superseded by the introduction of the shaped free-wheel body (also briefly called body), which has become an integral part of the hub as well as the rotation mechanism. The sprockets of various sizes are engaged there from the largest to the smallest, one by one or in groups or two or three depending on models. The body engages on the hub through a ratchet system allowing it to rotate in a single direction. In this way, traction is ensured at the moment when thrust is exerted on the pedals but the cranks remain free to stop moving while the bicycle advances. The sprockets are mounted on the body through grooved couplings, so as to ensure the transmission of the torque; in particular, the outer surface of the body is provided with a grooved profile and every sprocket has a central opening of shape corresponding to the grooved profile of the body. Furthermore, spacers are provided between the adjacent pairs of bodies, to leave the space necessary for the chain.

The geometry of the body must ensure a stable and strong coupling with the sprockets, ensuring easy replacement thereof and maximum flexibility over the maximum and minimum number of teeth able to be mounted, as well as over the number of sprockets themselves.

The evolution of racing bicycle transmissions in recent decades has been aimed at increasing the number of sprockets, passing quickly from 9 to 10, 11 or even 12 sprockets housed in the space in which there were initially 5 or less sprockets. This increase in the number of sprockets has allowed the reduction of the number of crowns or front gears (practically exclusive use of a double crankset instead of a triple crankset) keeping a size of the metric extension sufficient both for use in races, and by the average user; the term metric extension is meant to indicate the advancing of the bicycle for a complete revolution of the crown, when the chain is engaged with a certain sprocket, and is of course relative to that sprocket.

Another advantageous effect of the increase in the number of sprockets is the possibility of widening the range of the cassette, whilst keeping a variation between two adjacent sprockets within acceptable values; the range of the cassette is defined as the ratio between the maximum number of teeth and the minimum number of teeth of the cassette, and is equal to the ratio between the metric extension relative to the smaller sprocket and the one relative to the larger sprocket.

In recent years, with the advent of cassettes with a range of 420% or more, single-crown transmissions, namely with a single front gear, are becoming increasingly common; these transmissions are particularly appreciated since they avoid the adoption of the front derailleur, making the bicycle simpler (and therefore more reliable) and lighter.

In order to obtain a widening of the range of the cassette with the same number of sprockets, at least in theory, it is possible both to increase the number of teeth of the largest sprockets, and to reduce the number of teeth of the smallest sprockets. However, the variation between two adjacent sprockets should not exceed 20%, in order to avoid problems in the passage of the chain between the sprockets during gearshifting. Furthermore, it can easily be understood that the effect on the range is greater by reducing the number of teeth of the smallest sprocket by one, rather than by increasing the number of teeth of the largest sprocket by one; another factor that leads to the attempt to reduce the number of teeth of the smallest sprocket rather than to increase the number of teeth of the largest sprocket is the reduction in weight that can be obtained, for the same result on the range.

However, there are practical limits to the reduction of the number of teeth of the smallest sprocket. Indeed, given that the general geometry of the teeth is set by the chain and given that the bodies have a standardized diameter, the minimum number of teeth for a gear is that for which the bottom diameter of the sprocket (diameter of the ideal circle tangent to the bottoms between tooth and tooth) is sufficiently greater than the outer diameter of the grooves on the body. The dimensions currently envisaged for the bodies thus lead to the minimum number of teeth for a sprocket that can be mounted on the body as being 11.

In order to provide cassettes wherein the smallest sprocket can have 10 teeth or even less, different provisions have been devised.

These provisions are substantially based on the creation of an area of the outer body (in the axial direction, with respect to the middle plane of the hub) having a diameter smaller than standard; indeed, this is the position where the smallest sprockets are located. At the same time, the grooved area is shortened (in the axial direction) so that it does not reach the position where the smallest sprockets are located, and the threading with which the cassette is locked on the body is moved inwards (again in the axial direction).

In order to also allow the smallest sprocket to rotate as a unit with the body (whilst not being able to be mounted on the grooved profile), a known solution (US2013017914A1) provides that the gears are mounted on the body through an adapter having reduced diameter in the axially outer area; the adapter acts as an interface between the cassette and the grooved profile on the body. At the smallest sprocket, the diameter of the adapter is less than the outer diameter of the grooved profile and therefore the smallest sprocket can have less than 11 teeth.

Another known solution (US20170057598A1) provides that the largest sprockets engage on the grooved profile of the body, fixed to it through a ring nut, whereas the other sprockets (the smallest ones) form a single unit that is fixed to the largest sprockets through a bayonet coupling.

All of these solution are, however, not very satisfactory, since they imply substantial complications, both at the construction level and at the mounting and dismounting level.

Therefore, there is a need to more simply allow bicycle transmissions to be made in which the smallest sprocket has less than 11 teeth.

SUMMARY

The invention relates to a cassette adapted for mounting on a bicycle rear wheel hub by means of a mounting body. The cassette has a plurality of adjacent sprockets fixedly connected to one another along an axis of the cassette. The same cassette has an axial centering opening for centering on the mounting body without transmission of torque, and a plurality of attachment areas positioned a greater radial distance from the axis of the cassette than the radius of the centering opening for attachment to the mounting body.

BRIEF DESCRIPTION OF THE DRAWINGS

The features and advantages of the invention will become clearer from the following detailed description of a cassette and of a body of a bicycle transmission, made with reference to the attached drawings. In the drawings:

FIG. 13 is a front perspective view of another alternative embodiment of the body of FIG. 7;

FIG. 14 is a rear perspective view of another alternative embodiment of the cassette of FIG. 8;

FIG. 15 is an axial section view of the cassette of FIG. 14 and of the body of FIG. 13, mounted together.

DETAILED DESCRIPTION OF THE PREFERRED EMBODIMENTS

Figure 1:
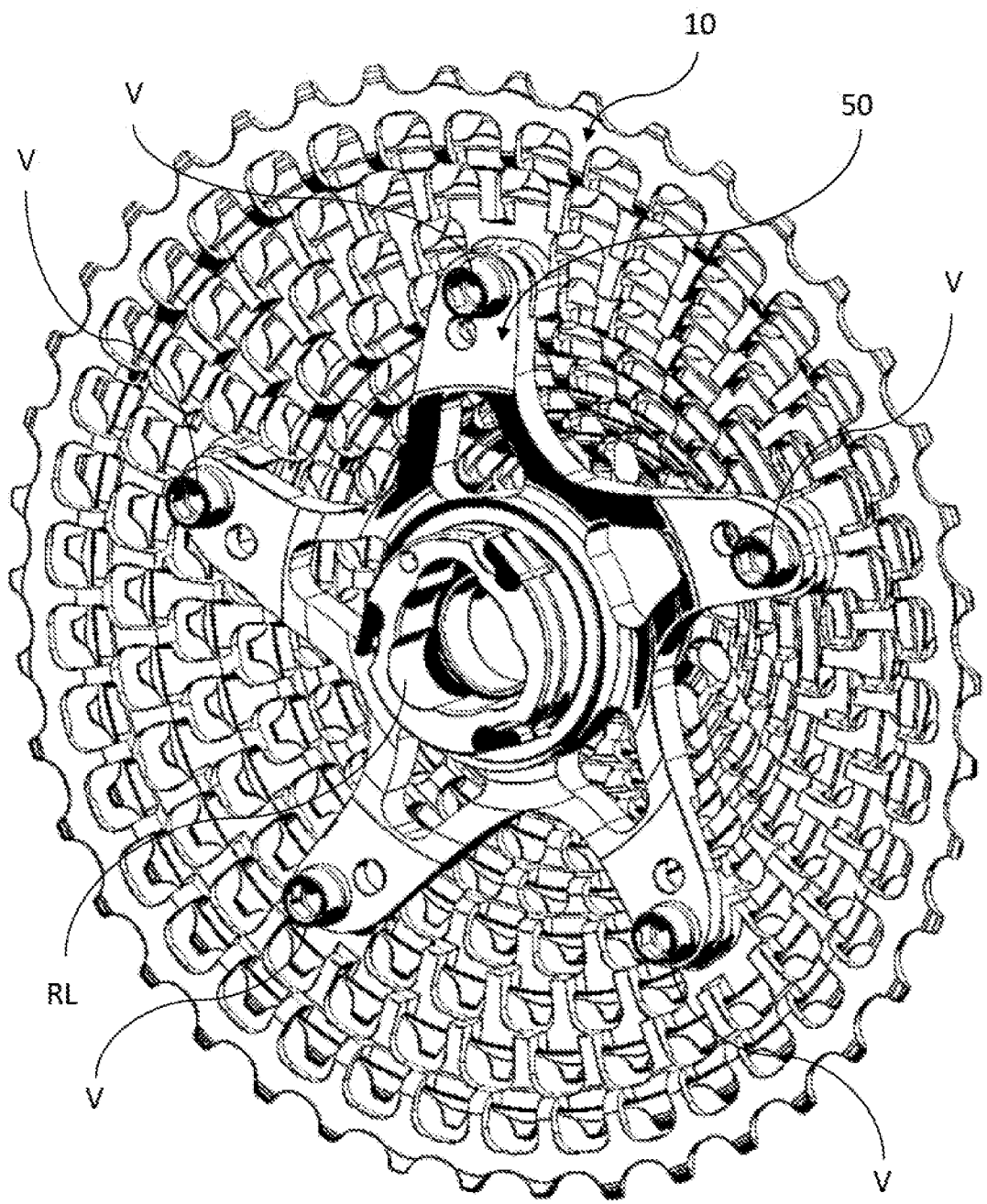
FIG. 1 is a rear perspective view of a cassette and a body of a bicycle transmission, mounted together.

The present invention relates, in a first aspect thereof, to a cassette according to claim 1 and, in a second aspect thereof, to a mounting body according to claim 12.

In the first aspect thereof, the invention relates to a cassette adapted for mounting on a bicycle rear wheel hub by means of a body, comprising a plurality of sprockets fixedly connected to one another, adjacent along an axis of the cassette, characterized in that it comprises an axial centering opening for centering on the body without transmission of torque, and a plurality of attachment areas to the body, positioned a greater radial distance from the axis of the cassette than the radius of the centering opening.

With this cassette, the attachment to the body does not take place through a grooved profile formed on the first portion of the body, but rather through the attachment areas, arranged in a radially outer position with respect to the centering opening. Therefore, the diameter of the centering opening is not constrained by the need to transmit the pedaling torque and therefore it can be less than what is normally provided; consequently, the first sprocket is not constrained to a minimum diameter and therefore its number of teeth can also be very low, for example 10, 9 or even less.

Furthermore, since the attachment of the cassette to the body takes place in a position far from the axis of the cassette, therefore with a favorably large arm, the stresses transmitted between cassette and body are less, for the same torque transmitted. This advantage can make it possible to reduce the dimensions of the parts that transmit the stresses, or also to select lighter materials even if they are weaker.

Preferably, each of the attachment areas to the body comprises a support surface for the body and at least one threaded hole at the support surface. A screw can thus be engaged in the threaded hole, inserted through a corresponding through hole on the body, so as to clamp the cassette on the body; the torque is not transmitted directly by the screw, but rather by friction against the support surface, thanks to the clamping of the screw.

Alternatively, each of the attachment areas to the body can comprises a support surface for the body and at least one threaded pin at the support surface. In this case, the clamping takes place by means of a threaded nut, after the threaded pin has been inserted in a through hole on the body. Also in this case, the torque is not transmitted directly by the threaded pin, but rather by friction against the support surface, thanks to the clamping of the nut.

Preferably, the attachment areas to the body are equally spaced from one another in the circumferential direction, around the axis of the cassette. Although, in principle, the distribution of the attachment areas can be whatever, it is preferred for them to be evenly distributed along the 360° around the axis of the cassette; in this way, the distribution of the stresses is more uniform and therefore the structural strength of the materials can be best exploited, thus allowing sizes and weights to be kept down.

Preferably, the sprockets of the cassette are formed from a single piece, suitably machined. For the purposes of the invention, as stated, it is necessary for the sprockets to be fixedly connected to one another, i.e. they for a monolithic assembly; this feature can also be obtained by joining together the sprockets, through whatever suitable means, like for example screws, couplings, gluing, welding; however, if the cassette is obtained from a single suitably shaped piece, it is possible to obtain the maximum rigidity and strength for the same weight, or lower weight for the same strength. Furthermore, making it in a single piece makes it possible to do without the spacers between adjacent sprockets and therefore ensures the maximum precision of parallel arrangement and in general of positioning of the sprockets, thus ensuring an extremely regular and fluid engagement with the chain, both during normal travel and during gearshifting. This greater precision can also make it possible to more easily reduce the thickness of the sprockets and the distance between them, without this involving risks of jamming in operation, thus making it possible to increase the number of sprockets for the same axial space occupied.

Preferably, adjacent sprockets are connected by connections aligned with recesses of the smallest sprocket, not with teeth of the smallest sprocket. This configuration ensures both the necessary strength and the absence of interference with the transmission chain during gearshifting.

Preferably, the centering opening comprises an axial support area, intended for resting against the body in the direction of the axis of the cassette, and a radial support area, intended for resting against the body in the radial direction. In this way, an effective and certain centering is obtained.

In a preferred embodiment, the axial support area comprises a conical surface, coaxial to the axis of the cassette. The conical surface provides the support in the axial direction in a constructively simple manner.

In a preferred embodiment, the axial support area comprises an annular flat surface, perpendicular to the axis of the cassette. The flat surface ensures extremely precise centering in the axial direction.

In a preferred embodiment, the radial support area comprises a cylindrical surface, coaxial to the axis of the cassette and facing radially towards the axis of the cassette. In another preferred embodiment, the radial support area comprises a cylindrical surface, coaxial to the axis of the cassette and facing radially towards the outside of the cassette. In both cases, the centering in the radial direction is extremely precise.

In the second aspect thereof, the invention relates to a body for mounting a cassette on a bicycle rear wheel hub, comprising:

a radially inner first portion, of tubular shape, with an axial cavity arranged along an axis of the body and intended for coupling with the hub through a free-wheel system, and a radially outer surface intended for mounting the cassette, wherein the first portion has axial extension between a first face and a second face of the body, and a radially outer second portion, intended for coupling with the cassette, characterized in that the second portion:

has shorter axial extension than the axial extension of the first portion;

extends radially outwards from the first portion; and a plurality of attachment areas for the cassette.

With this body, the attachment of the cassette does not take place through a grooved profile formed on the first portion of the body, but rather through the second portion, extending radially outside with respect to the radially outer mounting surface of the cassette. Consequently, the diameter of the first sprocket and therefore the number of teeth thereof is not constrained by the need to have a grooved profile on the first portion of the body.

Preferably, each of the attachment areas comprises a support surface for the cassette and at least one hole at the support surface, the hole passing right through the axial thickness of the second portion of the body. A screw can thus be inserted in the through hole, said screw then engaging in a corresponding threaded hole on the cassette, so as to clamp the cassette on the body; alternatively, the clamping can take place by means of a threaded nut, after a threaded pin projecting from the cassette has been inserted in the through hole on the body. In both cases, the torque is not transmitted directly by the screw or by the threaded pin, but rather by friction between the support surfaces, thanks to the clamping of the screw or of the nut.

Preferably, the support surfaces of the attachment areas are coplanar to one another and perpendicular to the axis of the body. In this way, all of the screws or nuts act in the same direction and thus best ensure the friction between the support surfaces and the consequent transmission of torque between the cassette and the body.

Preferably, the support surfaces of the attachment areas extend radially outwards as much as the second portion. In other words, the support surfaces are arranged as externally as possible on the second portion of the body, so as to be able to benefit from the maximum possible arm; in this way, the maximum torque is transmitted for the same stresses.

Preferably, the holes of the attachment areas are divided in two series, a first series a first radial distance from the axis of the body and a second series a second radial distance from the axis of the body, greater than the first radial distance. Thanks to the double series of holes, the body can be suitable for supporting cassettes of different sizes: for example, a cassette with sprockets having smaller diameters for a flat race and a cassette with sprockets having larger diameters for a climbing race.

Preferably, each attachment area comprises a hole in the first series and a hole of the second series, at a same support surface. It is thus possible to best exploit the structure of the body, in particular of the second portion thereof: if there were different support surfaces for the first series of holes and the second series of holes, with a determined sprocket there would be a part of the second portion of the body that works under stress, and another substantially discharged but in any case sized to be able to support the stresses in the case in which a different cassette is mounted; consequently, there would be a waste of strong material and therefore a needless extra weight of the body.

Preferably, the second portion of the body is star-shaped, comprising a plurality of spider legs, wherein every spider leg comprises one of the attachment areas at its radially outer end. This shape makes it possible to concentrate the presence of material where the greatest stresses occur, thus allowing the maximum containment of the weight of the body. Where attachment areas are not provided, indeed, the material of the body possibly present would be substantially discharged and thus useless.

Preferably, the attachment areas are equally spaced apart in the circumferential direction, around the axis of the body. Although in principle the distribution of the attachment areas can be whatever, it is preferred for them to be evenly distributed along the 360° around the axis of the body; in this way, the distribution of the stresses is more uniform and therefore the structural strength of the materials can be best exploited, thus allowing sizes and weights to be kept down.

Figure 2:
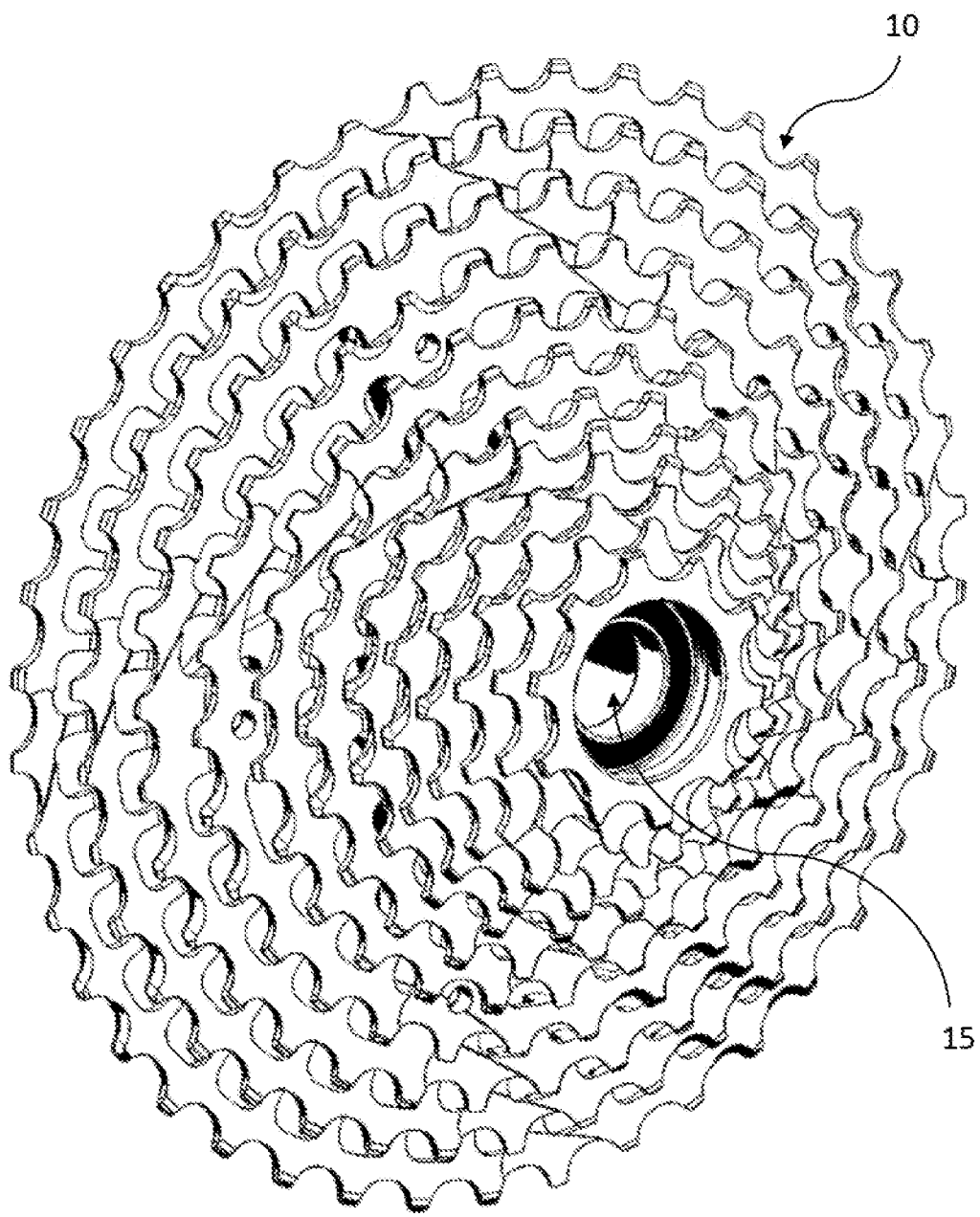
FIG. 2 is a front perspective view of the cassette and of the body of FIG. 1, mounted together.

With particular reference to FIGS. 1 and 2, a cassette 10 and a body 50, intended for a bicycle transmission (not shown as a whole), are shown. In particular, the body 50 is intended for mounting on a hub of a bicycle rear wheel (not shown) by means of a free-wheel mechanism RL, per se known, only some recesses of which formed in the body 50 are visible in FIG. 1. In FIGS. 1 and 2, the cassette 10 is shown mounted on the body 50, by means of screws V; clearly, in normal use the mounting of the cassette 10 on the body 50 takes place only after the latter has been mounted on the hub.

The cassette 10 comprises a plurality of sprockets 11, fixedly connected to one another and adjacent along an axis; the axis of the cassette 10 coincides with an axis of the body 50, when they are mounted together; furthermore, the axis of the body 50 coincides with an axis of the hub, when the body 50 is mounted on the hub. Given the coinciding of these axes when the cassette 10, the body 50 and the hub are mounted together, hereinafter and in the figures they will all be indicated with reference symbol X.

The cassette 10 illustrated in FIGS. 1 and 2 as well as in the other figures comprises twelve sprockets 11, each provided with teeth 12 separated by recesses 13; clearly, however, the number of sprockets 11 can be different according to requirements, as well as the number of teeth 12 (and of recesses 13) of each sprocket 11 is selected according to the requirements.

Figure 3:
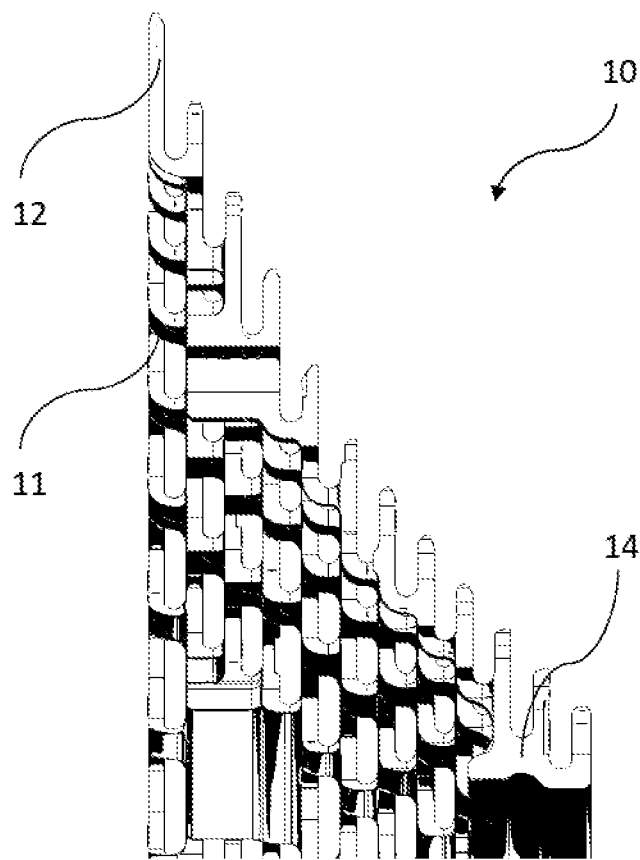
FIG. 3 is a section view of the cassette of FIG. 1.
Figure 4:
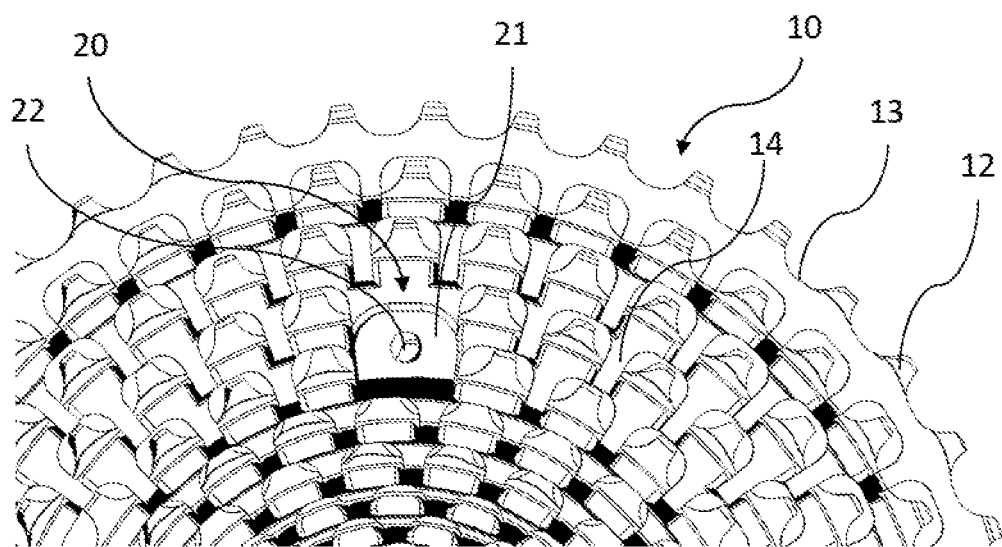
FIG. 4 is a rear view of part of the cassette of FIG. 1.
Figure 5:
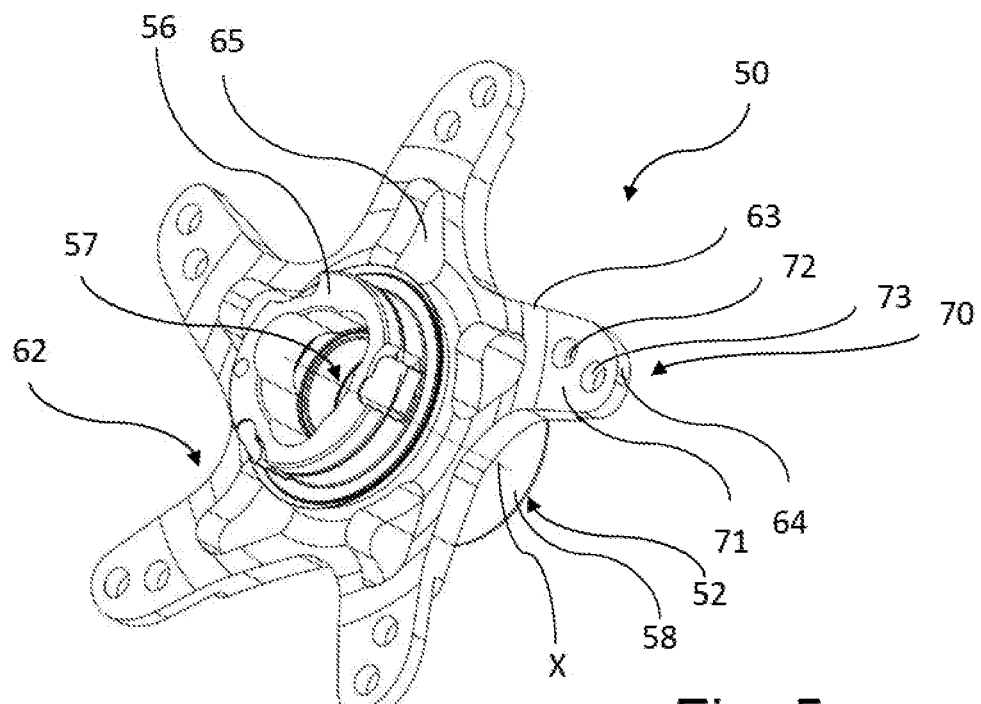
FIG. 5 is a rear perspective view of the body of FIG. 1.
Figure 6:
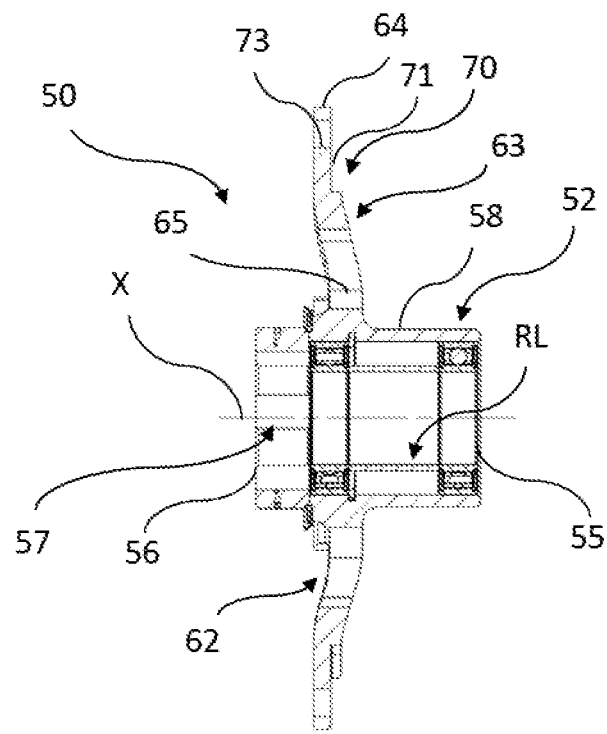
FIG. 6 is a section view of the body of FIG. 1.

As can be seen in FIG. 3, the cassette 10 is made monolithic, from a single piece of material (preferably steel of the suitable type) suitably machined; preferably, this machining is carried out by means of a numerically-controlled machine tool, from a forged semi-machined product. The sprockets 11 are equally spaced apart in the direction of the axis X, by means of joining portions or connections 14, which are formed between pairs of adjacent sprockets 11 so as to be at the recesses 13 of the smallest sprocket 11 of the pair.

At the axis X, the cassette 10 comprises an axial centering opening 15 (visible in FIG. 2 or rather in FIGS. 8 and 9), intended for mounting centered on the body 50, without possibility of transmission of torque between cassette 10 and body 50. For this purpose, the centering opening 15 does not comprise any inner grooved profile or other elements suitable for a shape coupling with the body 20.

Figures 7, 8:
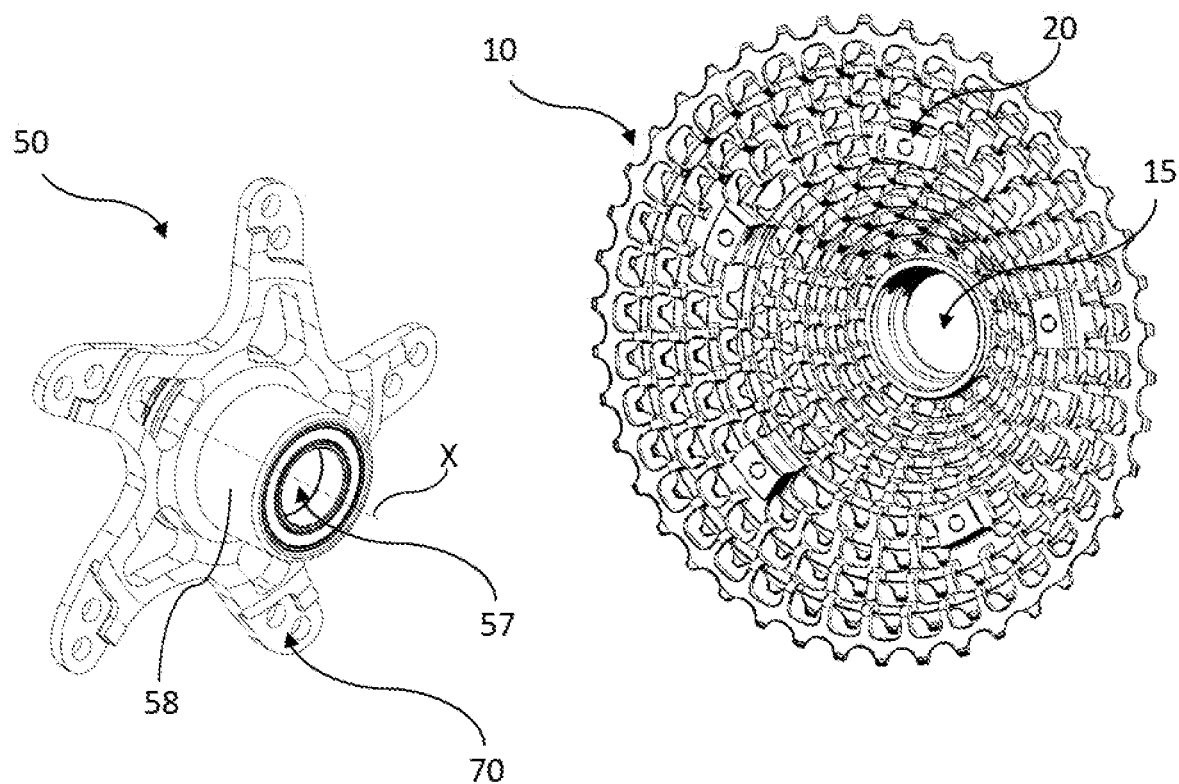
FIG. 7 is a front perspective view of the body of FIG. 1.
FIG. 8 is a rear perspective view of the cassette of FIG. 1.

As can be seen in FIG. 8, the cassette 10 also comprises a plurality of attachment areas 20, intended to allow the attachment of the cassette to the body 50. The attachment areas 20 are arranged in the cassette 10 at a distance in the radial direction from the axis X greater, and indeed much greater, than the radius of the centering opening 15; preferably, the distance in the radial direction of the attachment areas 20 from the axis X is equal to at least three times, even more preferably from three to six times, the radius of the centering opening 15. As can be seen in FIG. 8, this implies that the attachment areas 20 are, for example, at the fourth largest sprocket 11 of the cassette 10, or even further out.

Therefore, there are five attachment areas 20 of the illustrated cassette 10, equally spaced in the circumferential direction around the axis X, i.e. angularly spaced apart by 72°.

Each of the attachment areas 20 comprises a support surface 21 and a threaded hole 22, formed in the material of the cassette 10 at the support surface 21, so as to be surrounded by it. The holes 22 can be through holes or blind holes, provided that they are of sufficient depth to receive the screws V in mounting on the body 50, as will be illustrated hereinafter.

Figure 9:
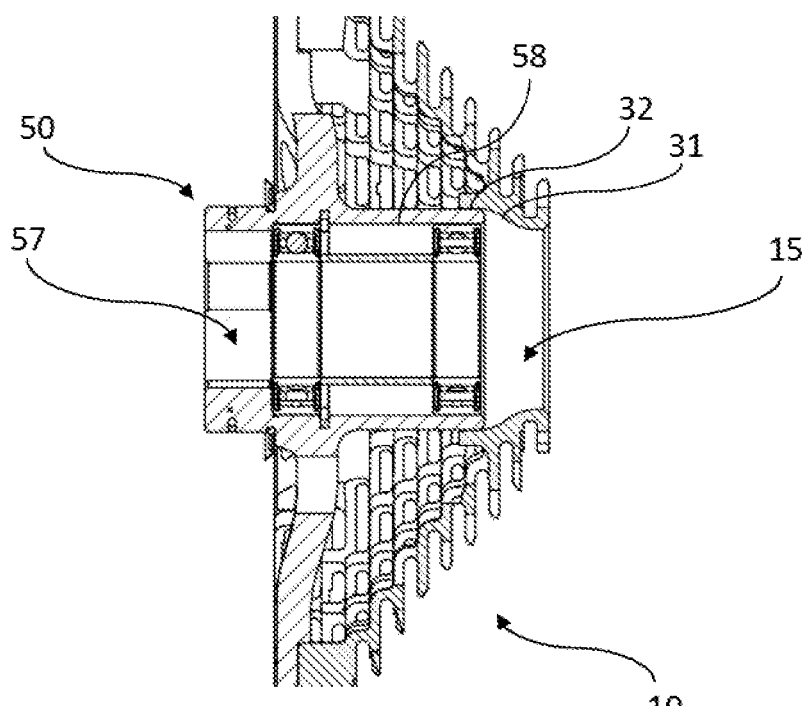
FIG. 9 is an axial section view of the cassette and of the body of FIG. 1, mounted together.
Figures 10, 11:
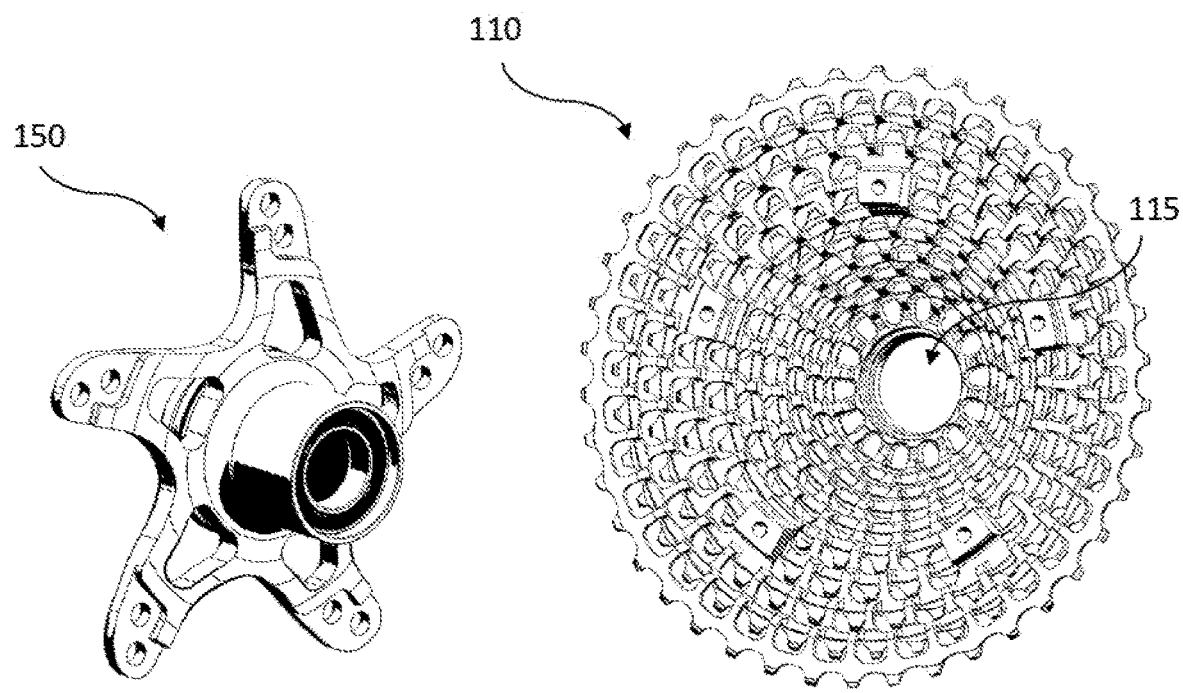
FIG. 10 is a front perspective view of an alternative embodiment of the body of FIG. 7.
FIG. 11 is a rear perspective view of an alternative embodiment of the cassette of FIG. 8.
Figure 12:
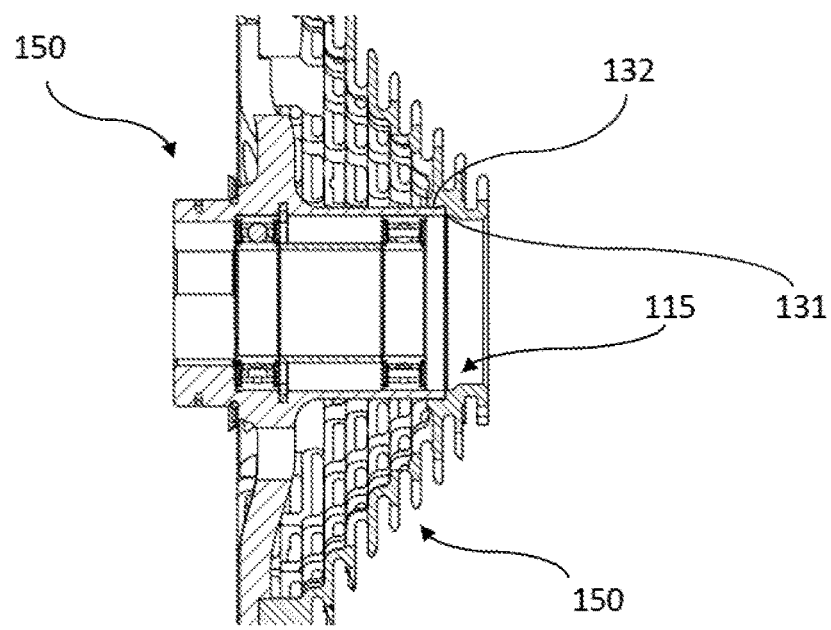
FIG. 12 is an axial section view of the cassette of FIG. 11 and of the body of FIG. 10, mounted together.

The centering opening 15 of the cassette 10 must allow the correct and precise positioning of the cassette 10 on the body 50. For this purpose, as can be seen in FIG. 9, the centering opening 15 comprises an axial support area 31 and a radial support area 32: the first is formed from a conical surface, coaxial to the axis X, whereas the second is formed from a cylindrical surface, facing radially towards the axis X.

The cassette 10, as stated, is intended to be mounted on the hub of a bicycle transmission by means of the body 50.

As can be seen in FIGS. 1, 5, 6 and 9, the body 50 comprises two portions, a radially inner first portion 52 and a radially outer second portion 62; the two portions are fixedly connected to one another and are preferably obtained from a single piece, suitably shaped. The first portion 52 is intended to be mounted on the hub, whereas the second portion 62 is intended to receive the cassette 10.

The first portion 52 has a tubular shape and extends axially from a first face 55 to a second face 56 of the body 50; it thus has axial extension equal to that of the body 50 itself.

The second portion 62 has shorter axial extension than that of the first portion 52, preferably less than ¼ of it.

The first portion 52 comprises an axial cavity 57, extending along the axis X and intended for coupling with the hub, through the free-wheel mechanism RL. The first portion 52 also comprises a radially outer surface 58, substantially cylindrical, extending in the axial direction between the second portion 62 of the body 50 and the first face 55, intended for coupling with the cassette 10.

The second portion 62 extends radially outwards from the first portion 52 and comprises spider legs 63 (for example five spider legs 63, as shown in figures) that give the second portion 62 a star shape.

The second portion 62 comprises a plurality of attachment areas 70 for the cassette 10, which are thus in radially outer position with respect to the first portion 52 of the body 50.

There are five attachment areas 70 of the illustrated body 50, equally spaced in the circumferential direction around the axis X, i.e. angularly spaced apart by 72°.

Each of the attachment areas 70 comprises a support surface 71 and at least one first hole 72, formed passing through the thickness of the second portion 62 of the body 50 at the support surface 71, so as to be surrounded by it. The support surfaces 71 are all coplanar to one another and perpendicular to the axis X.

Preferably, as well as the first hole 72 a second hole 73 is also provided, also passing through the thickness of the second portion 62 of the body 50 and at the same support surface 71. Two series of through holes are thus formed, a first series of first holes 72 and a second series of second holes 73; the holes of each series are arranged the same radial distance from the axis X, with the first holes 72 arranged a shorter distance from the axis X than the second holes 73.

According to the preferred embodiments shown in the figures, the attachment areas 70 are provided at each spider leg 63, in particular at the end 64 of every spider leg 63. The support surfaces 71 thus extend radially outwards, up to the ends 64, i.e. the outward radial extension of the support surfaces 71 corresponds to the outward radial extension of the second portion 62 of the body 50 and thus to the outward axial extension of the body 50 itself.

The spider legs 63 of the body 50 are configured so that the mechanical stresses, determined by the drive torque transmitted from the cassette 10 to the hub through the body 50, are distributed as evenly as possible. Therefore, the profile of the spider legs 63 is broadly rounded, both close to the ends 64 and to the base, towards the first portion 52 of the body 50. Furthermore, the areas of the spider legs 63 not engaged by significant stresses are removed to lighten the body 50, with formation of an opening 65 at the base of every spider leg 63.

FIGS. 10 to 12 and FIGS. 13 to 15 illustrate a cassette 110, 210 and a body 150, 250 according to a second and a third embodiment of the invention, which differ from what has been described up to here and shown in FIGS. 1-9 only for the slightly different way of centering the cassette 110, 210 on the body 150, 250. Therefore, all details of the cassette 110, 210 and of the body 150, 250 that are identical to the corresponding details of the cassette 10 and of the body 50 are not described here; in FIGS. 10-12 and 13-15 as well as in the following description, these details are indicated by the same reference numerals as the corresponding details of the cassette 10 and of the body 50; only the analogous but different details are indicated by reference numerals increased by 100 and by 200, respectively.

The centering opening 115 of the cassette 110 comprises an axial support area 131 and a radial support area 132: the first is formed from an annular flat surface, perpendicular to the axis X, whereas the second is formed from a cylindrical surface, facing radially towards the axis X. The body 150 has a greater extension in the axial direction.

The centering opening 215 of the cassette 210 comprises an axial support area 231 and a radial support area 232: the first is formed from an annular flat surface, perpendicular to the axis X, whereas the second is formed from a cylindrical surface, facing radially outwards. The body 250 has an extension in the axial direction analogous to the body 150.

The cassette 10, 110, 210 and the body 50, 150, 250 are used together, to transmit the drive torque to the hub, just as the cassettes and the bodies of the prior art are used together for the same purpose. Differently from known systems, however, with the cassette and the body according to the invention the torque is transmitted not by a shape coupling close to the axis X, but rather by the friction between the support surfaces 21 and the support surfaces 71, pressed against one another by the screws V, inserted in the through holes 72 or 73 and clamped in the threaded holes 22. The presence of the two series of through holes 72 and 73 makes it possible to mount equal cassettes 10, 110, 210 of two different sizes on bodies 50, 150, 250: small-sized cassettes, for which the first series of holes 72 is used, closer to the axis X, and larger-sized cassettes, for which the second series of holes 73 is used. This possibility increases the versatility of transmission.

Thanks to the invention, the torque is thus transmitted through areas relatively far from the axis X, with a double advantage. On the one hand, the minimum dimension constraint for the smallest sprocket of the cassette, which does not need to be engaged with any shape coupling and can thus be as small as required by the transmission requirements is eliminated. On the other hand, the stress exchanged between the cassette and the body, for the same torque transmitted, becomes lower thanks to the greater application arm with respect to the axis X.

Furthermore, the coupling between the cassette and the body is carried out in a very simple manner through the screws V, without therefore the need for tools or special equipment: a normal tool is sufficient to actuate the screws V, i.e.—depending on the shape of the head of the screws V— a screwdriver, a hexagonal key, a Torx key or other suitable key. The mounting and dismounting operations take little time, thus allowing quick replacements, for example during races.

Finally, an assembly of cassette and body according to the invention is lighter than an analogous assembly of the prior art, due particularly to the smaller number of pieces and the more effective transmission of stresses due to the torque transmitted.

List of Elements:
RL free wheel
X axis
V screws
10 cassette (110, 210)
11 sprockets
12 teeth
13 recesses
14 connections
15 centering opening (115, 215)
20 attachment areas
21 support surfaces
22 threaded holes
31 axial support area (131, 231)
32 radial support area (132, 232)
50 body (150, 250)
52 first portion
55 first face
56 second face
57 cavity
58 radially outer surface
62 second portion
63 spider legs
64 ends of the spider legs
65 opening in the spider legs
70 attachment areas
71 support surfaces
72 through holes (1 st series)
73 through holes (2 nd series)

What is claimed is:

1. A cassette adapted for mounting on a bicycle rear wheel hub by means of a body, said cassette comprising a plurality of sprockets that are formed as a single piece and fixedly connected to one another along an axis (X) of the body, wherein said cassette comprises an axial centering opening that has a radius for centering said cassette on the body and preventing transmission of torque between said cassette and said body, and a plurality of attachment areas to the body, positioned at a greater radial distance from the axis (X) of the cassette than the radius of the axial centering opening; and, wherein each of said plurality of attachment areas to the body is located so that a connection between two adjacent sprockets is formed at a recess between teeth on a smallest sprocket of said two adjacent sprockets.

2. The cassette according to claim 1, wherein each of the attachment areas to the body comprises a support surface for the body and at least one threaded hole at the support surface.

3. The cassette according to claim 1, wherein each of the attachment areas to the body comprises a support surface for the body and at least one threaded pin at the support surface.

4. The cassette according to claim 1, wherein the attachment areas to the body are mutually equally spaced apart in a circumferential direction, around the axis (X) of the cassette.

5. The cassette according to claim 1, wherein the axial centering opening comprises an axial support area, intended for resting against the body in the direction of the axis (X) of the cassette, and a radial support area intended for resting against the body in a radial direction.

6. The cassette according to claim 5, wherein the axial support area comprises a conical surface, coaxial to the axis (X) of the cassette.

7. The cassette according to claim 5, wherein the axial support area comprises an annular flat surface, perpendicular to the axis (X) of the cassette.

8. The cassette according to claim 5, wherein the radial support area comprises a cylindrical surface, coaxial to the axis (X) of the cassette and facing radially towards the axis (X) of the cassette.

9. The cassette according to claim 5, wherein the radial support area comprises a cylindrical surface, coaxial to the axis (X) of the cassette and facing radially towards the outside of the cassette.

10. A kit for mounting a cassette on a bicycle rear wheel hub, the kit comprising the cassette according to claim 1 and a mounting body to mount said cassette on the bicycle rear wheel hub.

11. A bicycle rear wheel cassette configured for attachment to a mounting body, said bicycle rear wheel cassette comprising a plurality of sprockets that are permanently fixedly connected to one another as a single piece along a cassette axis (X) and about a centering opening, and a selected sprocket of said plurality of sprockets has a plurality of attachment areas positioned a greater radial distance from the cassette axis (X) of the bicycle rear wheel cassette than a radius of the centering opening for attaching said bicycle rear wheel cassette to the hub mounting body; wherein each of said plurality of attachment areas are located on said selected sprocket so that a connection between said selected sprocket and an adjacent larger sprocket of the plurality of sprockets, is formed at a recess between teeth on the selected sprocket.

12. A bicycle rear wheel cassette assembly comprising: a bicycle rear wheel cassette configured for attachment to a bicycle rear wheel hub mounting body, said bicycle rear wheel cassette comprising a plurality of sprockets that are permanently fixedly connected to one another along a cassette axis (X) and about a centering opening and a selected sprocket of said plurality of sprockets has a plurality of attachment areas positioned a greater radial distance from the cassette axis (X) of the bicycle rear wheel cassette than a radius of the centering opening for attaching said bicycle rear wheel cassette to the bicycle rear wheel hub mounting body; and, a bicycle rear wheel hub mounting body having an axial opening centered on said cassette axis (X) and a smooth radially outer surface projection that is centered on said cassette axis (X) and fits within said centering opening, and a plurality of attachment points with each attachment point positioned between teeth on a smaller sprocket of two adjacent sprockets and at a greater radial distance than the radius of the centering opening and configured for attaching said bicycle rear wheel hub mounting body to said plurality of attachment areas.

* * * * *